(12) United States Patent
Kragh et al.

(10) Patent No.: US 9,316,754 B2
(45) Date of Patent: Apr. 19, 2016

(54) SEISMIC ACQUISITION SYSTEM INCLUDING A DISTRIBUTED SENSOR HAVING AN OPTICAL FIBER

(71) Applicant: Schlumberger Technology Corporation, Sugar Land, TX (US)

(72) Inventors: Ed Kragh, Essex (GB); Everhard Muyzert, Cambridgeshire (GB); Johan Robertsson, Wald (CH); Douglas E. Miller, Boston, MA (US); Arthur H. Hartog, Winchester (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 14/550,251

(22) Filed: Nov. 21, 2014

(65) Prior Publication Data
US 2015/0076334 A1    Mar. 19, 2015

Related U.S. Application Data

(63) Continuation of application No. 12/853,057, filed on Aug. 9, 2010, now Pat. No. 8,924,158.

(51) Int. Cl.
*G01V 5/00* (2006.01)
*G01V 1/00* (2006.01)
(Continued)

(52) U.S. Cl.
CPC .......... *G01V 1/003* (2013.01); *E21B 47/02208* (2013.01); *E21B 49/087* (2013.01);
(Continued)

(58) Field of Classification Search
CPC ....... G01V 1/3808; G01V 1/00; G01V 1/003; G01V 1/22; G01M 11/086; G01H 9/004; G01D 5/35358; E21B 49/087; E21B 47/02208

USPC ......................................................... 250/253
See application file for complete search history.

(56) References Cited

U.S. PATENT DOCUMENTS 2,432,378 A    12/1947  Burton
4,319,347 A     3/1982  Savit
(Continued)

FOREIGN PATENT DOCUMENTS

EP    0222666 B1    9/1991
EP    1096272 A2    5/2001
(Continued)

OTHER PUBLICATIONS

Brambilla et al., "Optical fibre sensors for earth sciences: from basic concepts to optimising glass composition for high temperature applications," 2002, Optics and Lasers in Engineering, vol. 37, pp. 2150232.*

(Continued)

*Primary Examiner* — Kiho Kim
(74) *Attorney, Agent, or Firm* — David J. Groesbeck (57) ABSTRACT

A seismic acquisition system includes a distributed optical sensor (having an optical fiber) and an interrogation subsystem configured to generate a light signal to emit into the optical fiber. The interrogation subsystem receives, from the distributed optical sensor, backscattered light responsive to the emitted light signal, wherein the backscattered light is affected by one or both of seismic signals reflected from a subterranean structure and noise. Output data corresponding to the backscattered light is provided to a processing subsystem to determine a characteristic of the subterranean structure.

18 Claims, 4 Drawing Sheets

(51) Int. Cl.

| | |
|---|---|
| *G01V 1/38* | (2006.01) |
| *G01D 5/353* | (2006.01) |
| *E21B 47/022* | (2012.01) |
| *E21B 49/08* | (2006.01) |
| *G01H 9/00* | (2006.01) |
| *G01V 1/36* | (2006.01) |
| *G01V 8/00* | (2006.01) |

(52) U.S. Cl.
 CPC ........... *G01D5/35358* (2013.01); *G01H 9/004* (2013.01); *G01V 1/00* (2013.01); *G01V 1/36* (2013.01); *G01V 1/3808* (2013.01); *G01V 8/00* (2013.01)

(56) References Cited

U.S. PATENT DOCUMENTS

| | | | |
|---|---|---|---|
| 4,524,436 A | 6/1985 | Hall et al. | |
| 4,547,869 A | 10/1985 | Savit | |
| 4,648,082 A | 3/1987 | Savit | |
| 4,737,106 A | 4/1988 | Laciny | |
| 4,805,726 A | 2/1989 | Taylor et al. | |
| 4,992,990 A | 2/1991 | Langeland et al. | |
| 5,194,847 A | 3/1993 | Taylor et al. | |
| 5,597,042 A | 1/1997 | Tubel et al. | |
| 5,668,775 A | 9/1997 | Hatteland | |
| 5,790,472 A | 8/1998 | Workman et al. | |
| 5,872,876 A * | 2/1999 | Kluth et al. | 385/12 |
| 5,892,860 A | 4/1999 | Maron et al. | |
| 6,205,263 B1 | 3/2001 | Lieberman et al. | |
| 6,246,048 B1 | 6/2001 | Ramos et al. | |
| RE37,283 E | 7/2001 | Kluth et al. | |
| 6,256,090 B1 | 7/2001 | Chen et al. | |
| 6,268,911 B1 | 7/2001 | Tubel et al. | |
| 6,274,863 B1 * | 8/2001 | Kersey | 250/227.14 |
| 6,496,261 B1 | 12/2002 | Wilsher et al. | |
| 6,510,104 B1 | 1/2003 | Ikegami | |
| 6,555,807 B2 | 4/2003 | Clayton et al. | |
| 6,588,266 B2 | 7/2003 | Tubel et al. | |
| 6,590,647 B2 | 7/2003 | Stephenson | |
| 6,590,831 B1 | 7/2003 | Bennett et al. | |
| 6,644,402 B1 | 11/2003 | Sharma et al. | |
| 6,722,437 B2 | 4/2004 | Vercaemer et al. | |
| 6,724,319 B1 | 4/2004 | Knaack et al. | |
| 6,725,924 B2 | 4/2004 | Davidson et al. | |
| 6,728,165 B1 | 4/2004 | Roscigno et al. | |
| 6,758,272 B2 | 7/2004 | Bixenman et al. | |
| 6,772,836 B2 | 8/2004 | Schetky et al. | |
| 6,789,621 B2 | 9/2004 | Wetzel et al. | |
| 6,837,310 B2 | 1/2005 | Martin | |
| 6,839,302 B2 | 1/2005 | Austad et al. | |
| 6,874,361 B1 | 4/2005 | Meltz et al. | |
| 6,913,079 B2 | 7/2005 | Tubel | |
| 6,939,717 B2 | 9/2005 | Jiang et al. | |
| 6,977,367 B2 | 12/2005 | Tubel et al. | |
| 7,021,388 B2 | 4/2006 | Williams | |
| 7,055,604 B2 | 6/2006 | Jee et al. | |
| 7,147,060 B2 | 12/2006 | Huber et al. | |
| 7,187,620 B2 | 3/2007 | Nutt et al. | |
| 7,240,730 B2 | 7/2007 | Williams et al. | |
| 7,243,715 B2 | 7/2007 | Wang et al. | |
| 7,261,162 B2 | 8/2007 | Deans et al. | |
| 7,301,474 B2 | 11/2007 | Zimmerman | |
| 7,304,725 B2 | 12/2007 | Hartog et al. | |
| 7,308,941 B2 | 12/2007 | Rolovic et al. | |
| 7,357,021 B2 | 4/2008 | Blacklaw | |
| 7,366,055 B2 | 4/2008 | Rønnekleiv et al. | |
| 7,412,117 B2 | 8/2008 | Chen et al. | |
| 7,413,011 B1 | 8/2008 | Chee et al. | |
| 7,420,475 B2 | 9/2008 | Adnan et al. | |
| 7,430,903 B2 | 10/2008 | Ramos | |
| 7,451,812 B2 | 11/2008 | Cooper et al. | |
| 7,558,155 B2 | 7/2009 | Rønnekleiv et al. | |
| 7,586,617 B2 | 9/2009 | Hartog et al. | |
| 7,597,142 B2 | 10/2009 | Hartog et al. | |
| 7,660,496 B2 | 2/2010 | Roberts | |
| 7,668,411 B2 | 2/2010 | Davies et al. | |
| 7,848,645 B2 | 12/2010 | Healey et al. | |
| 7,946,341 B2 | 5/2011 | Hartog et al. | |
| 8,050,139 B2 | 11/2011 | Berstad | |
| 8,326,540 B2 | 12/2012 | Hull et al. | |
| 2001/0023614 A1 | 9/2001 | Tubel et al. | |
| 2002/0066309 A1 | 6/2002 | Tubel et al. | |
| 2002/0196993 A1 | 12/2002 | Schroeder | |
| 2003/0033866 A1 | 2/2003 | Diakonov et al. | |
| 2003/0094281 A1 | 5/2003 | Tubel | |
| 2003/0205083 A1 | 11/2003 | Tubel et al. | |
| 2004/0011950 A1 | 1/2004 | Harkins | |
| 2004/0013040 A1 | 1/2004 | Maas et al. | |
| 2004/0114849 A1 | 6/2004 | Shah et al. | |
| 2005/0012036 A1 | 1/2005 | Tubel et al. | |
| 2005/0140966 A1 | 6/2005 | Yamate et al. | |
| 2005/0149264 A1 | 7/2005 | Tarvin et al. | |
| 2005/0180263 A1 | 8/2005 | Lambert et al. | |
| 2005/0224229 A1 | 10/2005 | Blacklaw | |
| 2005/0283276 A1 | 12/2005 | Prescott et al. | |
| 2006/0010973 A1 | 1/2006 | Brown | |
| 2006/0066839 A1 | 3/2006 | Payton | |
| 2006/0115204 A1 | 6/2006 | Marsh et al. | |
| 2006/0165344 A1 | 7/2006 | Mendez et al. | |
| 2006/0207764 A1 | 9/2006 | Rytlewski | |
| 2006/0215489 A1 | 9/2006 | Solheim et al. | |
| 2006/0225881 A1 | 10/2006 | O'Shaughnessy et al. | |
| 2007/0126594 A1 | 6/2007 | Atkinson et al. | |
| 2007/0199696 A1 | 8/2007 | Walford | |
| 2007/0227727 A1 | 10/2007 | Patel et al. | |
| 2007/0252717 A1 | 11/2007 | Fielder | |
| 2007/0263488 A1 | 11/2007 | Clark | |
| 2007/0265786 A1 | 11/2007 | Ozdemir et al. | |
| 2008/0030714 A1 | 2/2008 | Hall et al. | |
| 2008/0042869 A1 | 2/2008 | Zimmerman | |
| 2008/0134775 A1 | 6/2008 | Pipchuk et al. | |
| 2008/0139412 A1 | 6/2008 | Fuller | |
| 2008/0142212 A1 | 6/2008 | Hartog et al. | |
| 2008/0212917 A1 | 9/2008 | Chen | |
| 2008/0217022 A1 | 9/2008 | Deans | |
| 2008/0262737 A1 | 10/2008 | Thigpen et al. | |
| 2008/0278711 A1 | 11/2008 | Sikora et al. | |
| 2008/0297772 A1 | 12/2008 | Rogers et al. | |
| 2008/0314142 A1 | 12/2008 | Davies | |
| 2009/0006005 A1 | 1/2009 | Segal et al. | |
| 2009/0008078 A1 | 1/2009 | Patel | |
| 2009/0037111 A1 | 2/2009 | Radtke et al. | |
| 2009/0067776 A1 | 3/2009 | Ramos et al. | |
| 2009/0114386 A1 | 5/2009 | Hartog et al. | |
| 2009/0122319 A1 | 5/2009 | Ronnekleiv et al. | |
| 2009/0132183 A1 | 5/2009 | Hartog et al. | |
| 2009/0182509 A1 | 7/2009 | Kimminau et al. | |
| 2009/0242197 A1 | 10/2009 | Hackworth et al. | |
| 2009/0251991 A1 | 10/2009 | Ayela et al. | |
| 2009/0304322 A1 | 12/2009 | Davies et al. | |
| 2009/0323075 A1 | 12/2009 | Brady | |
| 2009/0326826 A1 | 12/2009 | Hull et al. | |
| 2010/0092176 A1 | 4/2010 | Hartog et al. | |
| 2010/0103771 A1 | 4/2010 | Gulbransen et al. | |
| 2010/0107754 A1 | 5/2010 | Hartog et al. | |
| 2010/0117830 A1 | 5/2010 | Strong et al. | |
| 2010/0207019 A1 | 8/2010 | Hartog et al. | |
| 2010/0278010 A1 | 11/2010 | Gubin et al. | |
| 2010/0313659 A1 | 12/2010 | Berg et al. | |
| 2011/0292763 A1 | 12/2011 | Coates et al. | |
| 2012/0020184 A1 | 1/2012 | Wilson et al. | |
| 2013/0167628 A1 | 7/2013 | Hull et al. | |

FOREIGN PATENT DOCUMENTS

| | | |
|---|---|---|
| EP | 1672344 B1 | 8/2008 |
| EP | 2072986 A1 | 6/2009 |
| GB | 2126820 A | 3/1984 |
| GB | 2222247 A | 2/1990 |
| GB | 2381281 A | 4/2003 |
| GB | 2392462 A | 3/2004 |
| GB | 2416398 A | 1/2006 |
| GB | 2438432 A | 11/2007 |

(56) References Cited

FOREIGN PATENT DOCUMENTS

| | | |
|---|---|---|
| GB | 2438533 A | 11/2007 |
| GB | 2440351 A | 1/2008 |
| GB | 2440956 A | 2/2008 |
| GB | 2443051 A | 4/2008 |
| GB | 2447691 A | 9/2008 |
| GB | 2451162 A | 1/2009 |
| GB | 2456300 A | 7/2009 |
| GB | 2457278 A | 8/2009 |
| GB | 2461191 B | 2/2012 |
| JP | 2009020003 A | 1/2009 |
| WO | 03050385 A2 | 6/2003 |
| WO | 03050385 A3 | 10/2003 |
| WO | 2005103437 A1 | 11/2005 |
| WO | 2006048647 A2 | 5/2006 |
| WO | 2007072173 A1 | 6/2007 |
| WO | 2007104915 A1 | 9/2007 |
| WO | 2008098380 A1 | 8/2008 |
| WO | 2009056855 A1 | 5/2009 |
| WO | 2009100087 A1 | 8/2009 |
| WO | 2010053931 A1 | 5/2010 |

OTHER PUBLICATIONS

Ferraro et al., "On the possible use of optical fiber Bragg gratings as strain sensors for geodynamical monitoring," 2002, Optics and Lasers in Engineering, vol. 37, pp. 115-130.*

Alcudia, et al., "Microphone Experiments and Applications in Exploration Seismology", SEG-2008-0188—2008 SEG Annual Meeting, Nov. 9-14, Las Vegas, Nevada; Expanded Abstracts, vol. 27, No. 1, 2008, pp. 188-192.

Bakulin, et al., "Acoustic Surveillance of Production Impairment with Real-Time Completion Monitoring", SPE 112301—SPE International Symposium and Exhibition on Formation Damage Control, Lafayette, Louisiana, Feb. 13-15, 2008, pp. 1-12.

Bakulin, et al., "Real-time Completion Monitoring with Acoustic Waves", Geophysics, vol. 73, No. 1, Dec. 26, 2007, pp. 15-33.

Barnoski, et al., "Fiber waveguides: a novel technique for investigating attenuation characteristics", Applied Optics, vol. 15, No. 9, 1976, pp. 2112-2115.

Biot, "Propagation of Elastic Waves in a Cylindrical Bore Containing a Fluid", Journal of Applied Physics, vol. 23, No. 9, 1952, pp. 997-1003.

Brown, et al., "Optical Fiber Sensors in Upstream Oil & Gas", SPE 79080—Technology Today Series, vol. 54, No. 11, Nov. 2002, pp. 63-65.

Cranch, et al., "High-responsivity fiber-optic flexural disk accelerometers", Journal of Lightwave Technology, vol. 18, No. 9, 2000, pp. 1233-1243.

Dakin, et al., "The reduction of semiconductor laser phase noise for sensor applications", Optica Acta: International Journal of Optics, vol. 33, No. 4, 1986, pp. 489-499.

Davies, "Passive acoustic monitoring helps protect wildlife", IET Knowledge Network, Aug. 2009, pp. 1-2.

Giallorenzi, et al., "Optical fiber sensor technology", Quantum Electronics, IEEE Journal, vol. 18, No. 4, 1982, pp. 626-665.

Hartog, et al., "On the theory of backscattering in single-mode optical fibers", Journal of Lightwave Technology, vol. 2, No. 2, 1984, pp. 76-82.

Healey, "Statistics of Rayleigh Backscatter from a Single-Mode Fiber", IEEE Transaction on Communications, vol. 35, No. 2, 1987, pp. 210-214.

Hill, "Photosensitivity in Optical Fiber Waveguides: From Discovery to Commercialization", IEEE Journal of Selected Topics in Quantum Electronics, vol. 6, No. 6, 2000, pp. 1186-1189.

Hughes, et al., "Static Pressure Sensitivity Amplification in Interferometric Fiber-Optic Hydrophones", Applied Optics, vol. 19, No. 1, 1980, pp. 98-107.

Juarez, et al., "Distributed Fiber-Optic Intrusion Sensor System", Journal of Lightwave Technology, vol. 23, No. 6, 2005, pp. 2081-2087.

Juarez, et al., "Field test of a Distributed Fiber-Optic Intrusion Sensor System for Long Perimeters", Applied Optics, vol. 46, No. 11, 2007, pp. 1968-1971.

Juarez, et al., "Polarization Discrimination in a Phase-Sensitive Optical time-Domain Reflectometer Intrusion-Sensor System", Optics Letters, vol. 30, No. 24, 2005, pp. 3284-3286.

Juskaitis, et al., "Distributed Interferometric Fiber Sensor System", Optics Letters, vol. 17, No. 22, 1992, pp. 1623-1625.

Juskaitis, et al., "Interferometry with Rayleigh Backscattering in a Single-Mode Optical Fiber", Optics Letters, vol. 19, No. 3, 1994, p. 225.

Kirkendall, "Distributed Acoustic and Seismic Sensing", IEEE Optical Fiber Communications Conference and Exposition Fiber Optic Engineers Conference, Mar. 2007, pp. 1-3.

Kirkendall, et al., "Overview of high performance fibre-optic sensing", Journal of Physics D: Applied Physics, vol. 37, No. 18, 2004, pp. 197-216.

Liu, et al., "Effects of an Elastic Membrane on Tube Waves in Permeable Formations", The Journal of the Acoustical Society of America, vol. 101, No. 6, 1997, pp. 3322-3329.

Mermelstein, et al., "Raleigh Scattering Optical Frequency Correlation in a Single-Mode Optical Fiber", Optics Letters, vol. 26, No. 2, 2001, pp. 58-60.

Mickelson, et al., "Theory of the Backscattering Process in Multimode Optical Fibers", Applied Optics, vol. 21, No. 11, 1982, pp. 1898-1909.

Miller, et al., "Implosive Borehole Acoustics", 2006.

Nash, "Review of interferometric optical fibre hydrophone technology", IEEE Proceedings on Radar, Sonar and Navigation, 143, No. 3, 1996, pp. 204-209.

Norris, "Stoneley-wave Attenuation and Dispersion in Permeable Formations", Geophysics, vol. 54, No. 3, 1989, pp. 330-341.

Posey, et al., "Rayleigh Scattering Based Distributed Sensing System for Structural Monitoring", 14th Conference on Optical Fibre Sensors, Venice, Italy, 2001, pp. 678-681.

Posey, et al., "Strain Sensing Based on Coherent Rayleigh Scattering in the Optical Fibre", Electronics Letter, 36, No. 20, 2000, pp. 1688-1689.

Schoenberg, et al., "Attenuation of Acoustic Modes Due to Viscous Drag at the Borehole Wall", Geophysics, vol. 52, No. 11, 1987, pp. 1566-1569.

Strong, et al., "A comprehensive distributed pipeline condition monitoring system and its field trial", 7th International Pipeline Conference, vol. 1, 2008, pp. 711-719.

Winbow, "Seismic Sources in Open and Cased Boreholes", Geophysics, vol. 56, No. 7, 1991, pp. 1040-1050.

\* cited by examiner

SEISMIC ACQUISITION SYSTEM INCLUDING A DISTRIBUTED SENSOR HAVING AN OPTICAL FIBER

CROSS-REFERENCE TO RELATED APPLICATIONS

This application claims the benefit of U.S. patent application Ser. No. 12/853,057, filed Aug. 9, 2010, which is incorporated herein by reference.

BACKGROUND

Subterranean surveying can be used to determine the content of a subterranean structure, which can be underneath a land surface or under a water bottom surface (e.g., seabed). Marine subterranean surveying involves deploying sensors that are towed through a body of water, or deployed on the water bottom surface. Land subterranean surveying involves deploying the sensors on the land surface.

One type of subterranean surveying is seismic subterranean surveying, in which seismic signals generated by seismic sources are propagated into a subterranean structure. The propagated seismic signals are reflected from subterranean elements in the subterranean structure, where the reflected signals are detected by the seismic sensors. The data collected by the seismic sensors are then processed to determine characteristics of the subterranean structure.

SUMMARY

In general, according to some embodiments, a seismic acquisition system includes a distributed sensor having an optical fiber, and an interrogation subsystem to generate a light signal to emit into the optical fiber. The interrogation system receives, from the distributed sensor, backscattered light responsive to the emitted light signal. The backscattered light is affected by one or both of seismic signals reflected from a subterranean structure and noise. Data corresponding to the backscattered light is output to a processing subsystem to determine a characteristic of the subterranean structure.

Other or alternative features will become apparent from the following description, from the drawings, and from the claims.

BRIEF DESCRIPTION OF THE DRAWINGS

Some embodiments are described with respect to the following figures.

DETAILED DESCRIPTION

In performing seismic surveys, seismic signals detected by seismic sensors can be contaminated by noise. In a marine environment, the noise can include swell type noise induced from the sea surface and/or noise caused by vibration of components dragged through a body of water. In a land environment, the noise can include trapped energy propagating in the near-surface of the ground, such as ground-roll noise, and/or by energy propagating in the air across the survey area. Conventionally, seismic surveys are typically designed to try to minimize various types of noise, such as by specifying numbers of seismic sensors, spacings between seismic sensors, types of seismic sensors, and/or specific plantings of seismic sensors and seismic sources into a ground surface. Moreover, the hardware design of seismic sensors and/or seismic sources can be configured to attenuate noise.

An issue associated with conventional noise mitigation techniques is that they may be relatively complex, can be expensive, or can be time-consuming to implement.

In accordance with some embodiments, for more efficient noise mitigation when performing seismic surveys, a seismic acquisition system having a distributed optical sensor is provided. The distributed optical sensor includes an elongated optical fiber (or multiple elongated optical fibers). The distributed optical sensor can be used to measure seismic noise in any environment, and the measurement collected by the distributed optical sensor can then be used as a reference for subtracting noise from target seismic signals.

Although reference is made to using the distributed optical sensor to measure seismic noise, it is noted that the distributed optical sensor can also be used to directly measure seismic signals reflected from subterranean elements of a subterranean structure. In such implementations, the distributed optical sensor is used to replace conventional seismic sensors (such as geophones, hydrophones, accelerometers, etc.). In other alternative implementations, the distributed optical sensor can be used in connection with conventional seismic sensors. In some examples, the distributed optical sensor is for positioning outside the subterranean structure (such as above or on a ground surface that is above the subterranean structure).

In response to light signal emitted into the optical fiber of the distributed optical sensor, backscattered light is provided by the distributed optical sensor to an interrogation subsystem. Backscattered light provided by an optical fiber refers to a portion of light reflected by the optical fiber (or reflectors associated with the optical fiber) in a direction opposite to the direction of light emitted into the optical fiber. The backscattered light is affected by one or both of (1) noise in the seismic surveying environment, and (2) seismic signals reflected from a subterranean structure. Data corresponding to the backscattered light is output to a processing subsystem, which can use the data to determine a characteristic of the subterranean structure.

Depending upon the configuration of the seismic acquisition system, the data corresponding to the backscattered light can represent seismic signals with noise attenuated, can represent both seismic signals and noise, or can represent just noise. In some implementations, the seismic acquisition system can include seismic sensors in addition to the distributed optical sensor, with the noise derived from the data corresponding to the backscattered light used to remove the noise component from seismic data collected by the seismic sensors. As noted above, in other implementations, seismic sensors do not have to be used, with the distributed optical sensor used for detecting seismic signals reflected from the subterranean structure.

Figure 1:
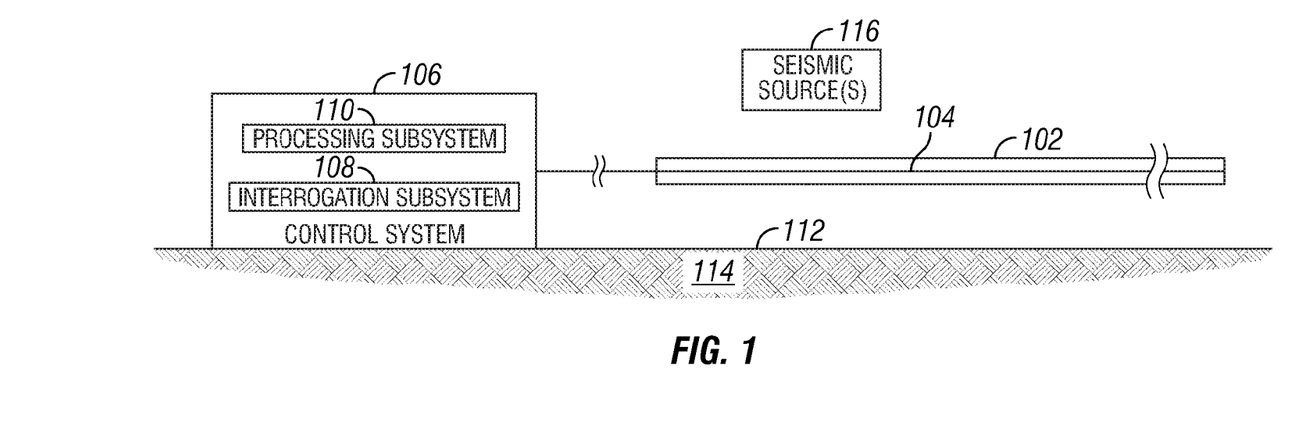
FIGS. 1 and 2 are example arrangements for performing seismic subterranean surveying in which some embodiments of the invention can be incorporated.

FIG. 1 depicts an example arrangement of a surface seismic acquisition system that includes a distributed optical sensor 102 having an elongated optical fiber 104 (or multiple elongated optical fibers). The optical fiber 104 is connected to a control system 106 that has an interrogation subsystem 108 and a processing subsystem 110. The interrogation subsystem 108 is able to generate light signal for emission into the optical fiber 104. The interrogation subsystem 108 also includes an optical receiver to receive, from the optical fiber 104, backscattered light that is responsive to the emitted light signal.

The distributed optical sensor 102 is provided above a surface 112, underneath which is a subterranean structure 114. One or multiple seismic sources 116 is (are) provided for emitting seismic signals into the subterranean structure 114. The subterranean structure 114 reflects seismic signals back to the surface 112, which can be detected by the distributed optical sensor 102 (or by seismic sensors). As noted above, based on the configuration of the seismic acquisition system, the optical fiber 104 can be used to detect just noise, to detect both seismic signals reflected from the subterranean structure 114 and noise, or to detect seismic signals with noise attenuated. The arrangement shown in FIG. 1 can be used for land seismic surveying. Alternatively, the distributed optical sensor 102 of FIG. 1 can be provided in a cable that is on a water bottom surface (e.g., seabed) to perform marine seismic surveying.

Figure 2:
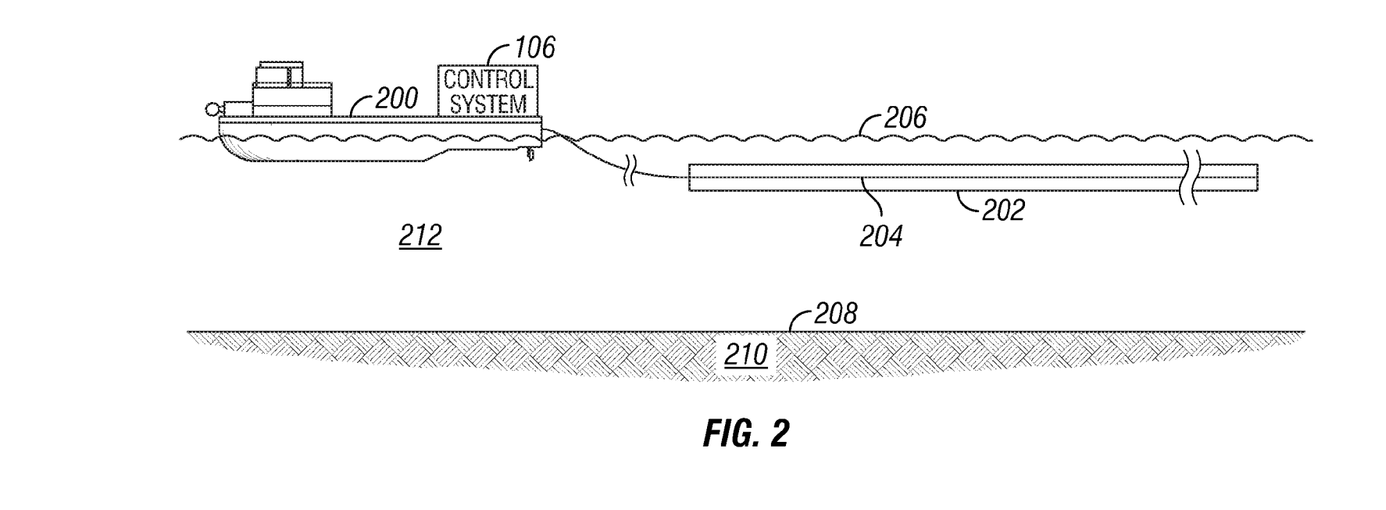

FIG. 2 shows an alternative implementation in which a distributed optical sensor 202 having an optical fiber 204 (or multiple optical fibers) is towed through a body of water 212 underneath a water surface 206. The distributed optical sensor 202 is towed by a marine vessel 200, on which the control system 106 is provided. In some implementations, the distributed optical sensor 202 is part of a streamer that is towed through the body of water 212. Although not shown, one or multiple seismic sources can also be towed by the marine vessel 200 (or by another marine vessel). The seismic source(s) is (are) activated to generate seismic signals that are propagated into a subterranean structure 210 underneath a water bottom surface 208. Reflected seismic signals from the subterranean structure 210 are detected by either the distributed optical sensor 202 having the optical fiber 204, or by seismic sensors (not shown) that are part of the streamer towed by the marine vessel 200.

Alternatively, a marine survey system having a distributed optical sensor can be stationary (or almost stationary) rather than towed at typical tow speeds for seismic surveying. For example, a streamer can be stationary (or almost stationary), or an arrangement of a large number of streamers or optical fibers can be provided that are stationary or almost stationary (towed at relatively slow speeds).

Figure 3:
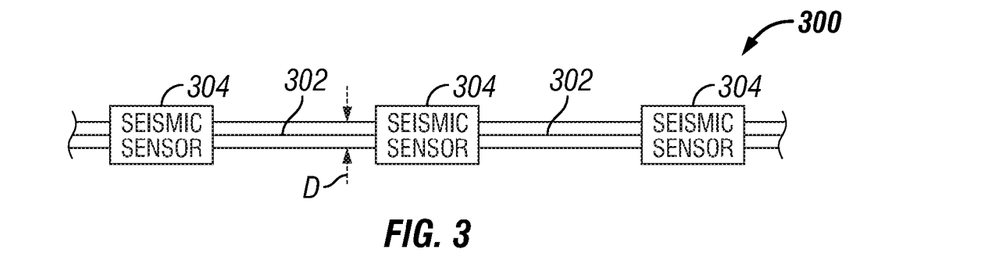
FIGS. 3 and 4 are schematic diagrams of portions of seismic acquisition structures according to alternative embodiments.

FIGS. 1 and 2 show the distributed optical sensor 102 or 202 without the presence of seismic sensors. FIG. 3 shows alternative implementations in which a seismic acquisition structure 300 includes both an optical fiber 302 as well as seismic sensors 304 (e.g., geophones, hydrophones, accelerometers, etc.). Not shown in FIG. 3 are electrical wires that connect to the seismic sensors 304, in some implementations. In some implementations, some or all of the seismic sensors are optical and are interconnected and connected to the control system 106 by optical fibers rather than electrical wires. The seismic acquisition structure 300 shown in FIG. 3 can be part of a land-based cable, a seabed cable, or a streamer. In operation, the seismic sensors 304 are used to detect seismic signals reflected from a subterranean structure, in response to seismic signals produced by one or more seismic sources. The optical fiber 302, on the other hand, can be used to measure noise, where the noise as measured by the optical fiber 302 can be used to remove noise components from seismic signals detected by the seismic sensors 304.

By using the distributed optical sensor according to some implementations, the diameter of a support structure (e.g., streamer or cable) can be less than 4 cm (centimeters), and more specifically, less than or equal to 1 cm, according to some examples. For example, as shown in FIG. 3, the diameter D of the sections of the seismic acquisition structure 300 corresponding to the optical fibers would be less than the predefined diameter (4 cm or 1 cm).

Figure 4:
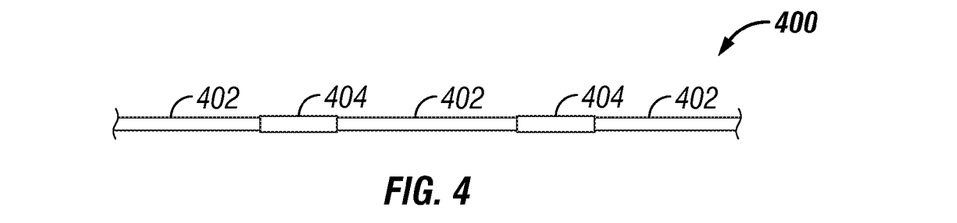

In some implementations, backscattering of light in response to light emitted into an optical fiber is caused by inhomogeneities of the optical fiber. In other implementations, a distributed optical sensor can be provided with one or multiple regions of different sensitivities along the optical fiber for causing backscattering of light. For example, as shown in FIG. 4, a distributed optical sensor 400 has optical fiber sections 402 having a first sensitivity, and sections 404 having a second sensitivity that is higher than the first sensitivity. In one example, the sections 404 of higher sensitivity can be implemented with fiber optic accelerometers. In alternative implementations, the sections 402 and sections 404 can be optical fiber sections filled with different types of materials to provide different sensitivities. In further alternative implementations, the sections 404 can be discrete optical fiber sensors. A discrete optical fiber sensor, in some examples, can include a length of a sensing fiber that is coiled about and coupled to a transducer. In other implementations, the sections 404 can be implemented with wavelength selected elements, such as fiber Bragg gratings. In implementations according to FIG. 4, backscattering of light is caused by the sections 404 having higher sensitivity than optical fiber sections 402 of the distributed optical sensor 400.

In another implementation, a bundle of multiple fibers is used with one fiber dedicated to the distributed optical sensor and a second fiber having Bragg gratings. Further fibers could be used for discrete optical fiber sensors by coiling the fiber.

Figure 5:
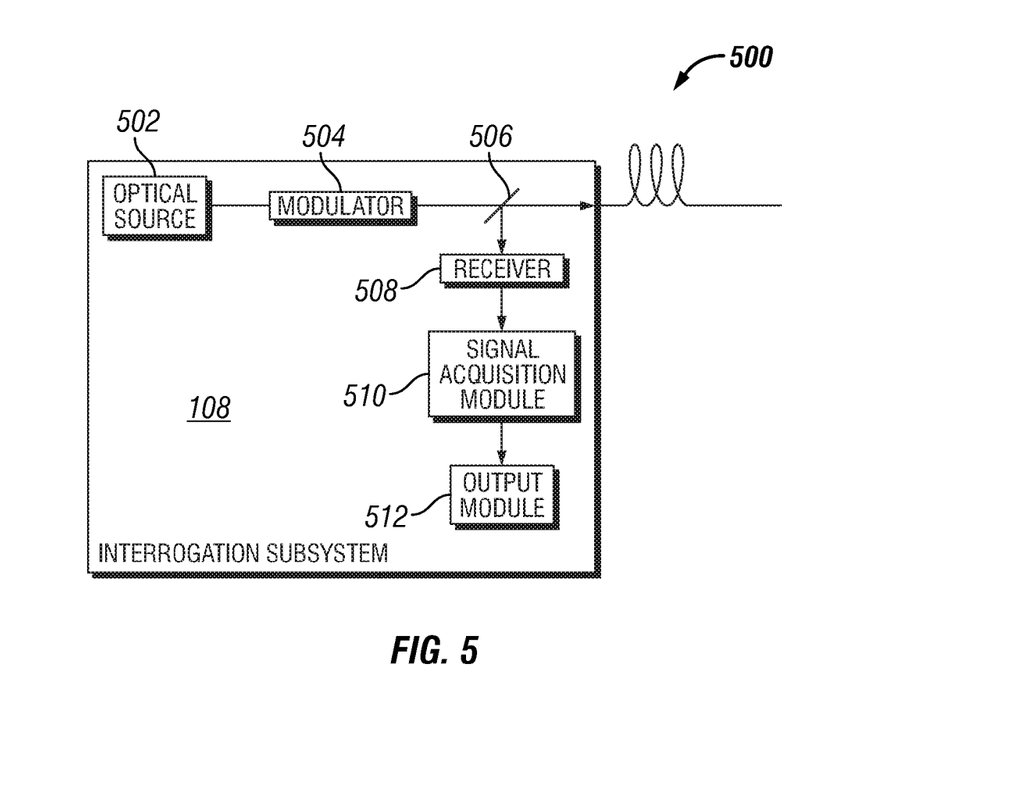
FIG. 5 is a schematic diagram of an arrangement including a distributed optical sensor with an optical fiber and an interrogation system, according to some embodiments.

FIG. 5 illustrates an interrogation subsystem according to some implementations that can be used with a distributed optical sensor 500 (which can be any of the sensors shown in FIGS. 1-4). The interrogation system 108 includes an optical source 502 that generates an optical signal, such as an optical pulse (or sequence of optical pulses), for interrogating the optical fiber in the distributed sensor 500. In some implementations, the optical source 502 may include a narrow band laser source that is followed by a modulator 504 that selects short pulses from the output of the laser. Optionally, an optical amplifier may be used to boost the peak power of the pulses launched into the optical fiber. The amplifier may be placed after the modulator 502, and the amplifier may also be followed by a filter for filtering in the frequency domain (e.g., bandpass filter) and/or in the time domain.

The pulses emitted by the optical source 502 are launched into the optical fiber of the distributed optical sensor 500 through a directional coupler 506, which separates outgoing and returning optical signals and directs the returning (backscattered) signals to an optical receiver 508. The directional coupler 506 may be a beam splitter, a fiber-optic coupler, a circulator, or some other optical device.

The backscattered optical signals returned from the optical fiber of the distributed optical sensor 500 in response to interrogating pulses may be detected and converted to an electrical signal at the receiver 508. This electrical signal may be acquired by a signal acquisition module 510 (e.g., an analog-to-digital converter) and then transferred as data representing the backscattered signals to an output module 512 for outputting the data to the processors subsystem 110 of FIG. 1.

When an optical fiber portion is disturbed by noise and/or seismic waves ("input waves"), the optical fiber portion is strained by the input waves. A strain on the optical fiber portion changes the relative position between the scattering centers by simple elongation of the optical fiber portion. The strain also changes the refractive index of the glass of the optical fiber portion. Both these effects alter the relative phase of the light scattered from each scattering center.

In some examples, the distributed sensing technology can be based on coherent Rayleigh optical time domain reflectometry. With such a technique, incident light is scattered due to inhomogeneities along the length of the optical fiber. For seismic applications, the pulse width of one or more pulses generated by the optical source 502 is set to achieve a spatial resolution that allows the optical fiber to be sensitive to a target input wave, which can be noise and/or seismic signals. As a result, a seismic acquisition system that is sensitive to variations in fiber propagation conditions caused by external influences, such as vibrations, can be provided.

In alternative implementations, the optical fiber can be manufactured with more sensitive sections (e.g., sections 404 shown in FIG. 4) that can cause backscatter of light whose characteristics are affected by presence of the input waves.

The distributed optical sensor measures a change in the optical fiber averaged over a relatively small distance, referred to as the spatial resolution R. In some implementations, the spatial resolution R is based on the choice of the pulse duration and/or the signal processing technique that is used. Multiple pulses can also be produced for emission into the optical fiber. When multiple pulses are used, the time separation between the pulses of different frequency can dictate the spatial resolution of the overall system. For external perturbations with a wavelength smaller than R, the distributed optical sensor will effectively average perturbations to measure an average over the wavefield thus reducing its amplitude. This leads to attenuation of the perturbations.

The perturbations that can affect the distributed sensor include noise and/or seismic signals. The noise has a wavelength N, and the seismic signals have a wavelength S. The noise can be ground-roll noise and/or airborne noise for land seismic surveys, or tow noise in marine seismic surveys. In the ensuing discussion, it is assumed that the noise wavelength is smaller or equal to the seismic signal wavelength, $N \leq S$.

In some implementations, the seismic acquisition system is designed such that the spatial resolution R is smaller than the wavelength S of the seismic signals but greater than or equal to the wavelength N of noise. In other words, $N \leq R < S$. Since the spatial resolution R is greater than or equal to the noise wavelength N, the distributed optical sensor is able to record seismic signals with attenuated noise. Since the noise wavelength N has a wavelength smaller than or equal to R, the distributed optical sensor will effectively average the noise to reduce its amplitude, which leads to attenuation of the noise. Although noise has been attenuated using this arrangement, additional noise attenuation processing can be performed, such as by using filtering (e.g., multichannel filtering) to perform noise attenuation at the processing subsystem 110. Examples of multichannel filtering include frequency-wavenumber filtering or digital group forming.

In another arrangement, the spatial resolution R is selected to be smaller than both the noise wavelength and seismic signal wavelength, $R < N \leq S$. With such an arrangement, both the noise and seismic signals will be sampled adequately. Therefore, data corresponding to backscattered light received from the distributed sensor will have both noise and seismic signal components. The processing subsystem 110 can use a filtering technique, such as multichannel filtering, to attenuate the noise component.

In some implementations, the dynamic range of the distributed optical sensor is limited so that the distributed sensor does not record the true amplitude for strong signals (signals having large amplitudes). In this case, a high spatial resolution of the distributed optical sensor will allow for estimation of the propagation speed of the noise, where the propagation speed of the noise can be used in further data processing in noise attenuation algorithms.

In the foregoing discussion, it is assumed that the optical fiber is straight (in other words, there are no curvatures on the optical fiber). An optical fiber that is "straight" does not mean that the optical fiber has to be perfectly straight—manufacturing tolerances and winding or unwinding of an optical fiber on a spool can cause some small amount of curvature on the optical fiber, to within predefined specifications.

Figure 6:
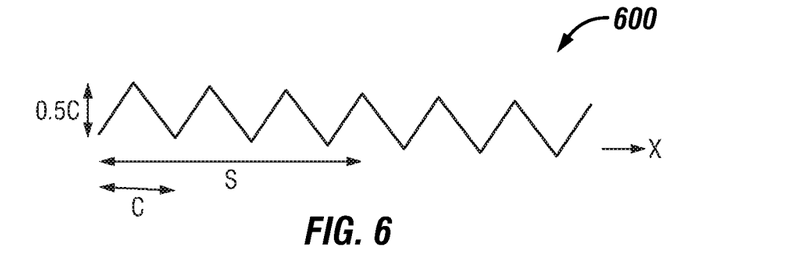
FIGS. 6-9 illustrate different implementations of distributed optical sensors including optical fibers, according to various embodiments.
Figure 7:
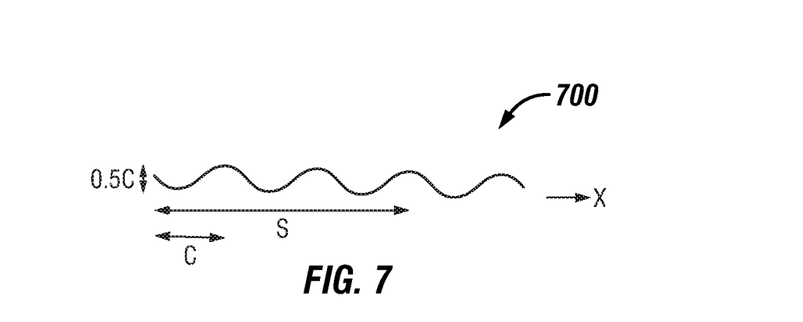

In alternative implementations, an optical fiber can be designed with curved portions, such as an optical fiber 600 or optical fiber 700 shown in FIG. 6 or 7, respectively. As depicted in FIG. 6 or 7, each optical fiber 600 or 700 is generally wavy, and is associated with a curvature C. The curvature C represents half a wavelength of the generally wavy optical fiber 600 or 700. FIG. 6 or FIG. 7 also shows the wavelength S of seismic signals, according to some examples. The amplitude range of the wavy optical fiber 600 or 700 is approximately 0.5 C, in some implementations. Different amplitude ranges can be used in other implementations. An amplitude range of the wavy optical fiber 600 or 700 refers to a range defined between a maximum peak and a minimum peak of the wavy optical fiber.

The curved portions of the optical fiber 600 or 700 allow for detection of noise components in two orthogonal directions (a first direction that is generally parallel to the dominant axial direction x of the optical fiber 600 or 700, and a second direction that is generally perpendicular to the dominant axial direction in the horizontal plane). In a first configuration, the spatial resolution R and curvature C can be designed such that $R < C < N \leq S$. In this case both the spatial resolution R and curvature C are less than the noise wavelength N and seismic signal wavelength S. In this manner, the distributed optical sensor 600 or 700 measures both noise and seismic signal components. Signal processing can be performed to resolve the noise and seismic signal components into two directions: the first direction and the second direction noted above. Filtering can then be applied to the noise components to perform noise attenuation.

In a second configuration, the spatial resolution R and curvature C are designed such that $N \leq C \leq R < S$. In this configuration, the curvature C and spatial resolution R are greater than or equal to the noise wavelength N. The distributed sensor in this arrangement will average the noise component in the different horizontal directions to provide a two-dimensional spatial filter for noise mitigation (in which noise is attenuated).

In each of the FIG. 6 or FIG. 7 implementations, the optical fiber has a dominant axial direction x—however, in implementations in which the optical fiber is laid out in a generally curved two-dimensional pattern, where the optical fiber weaves back and forth in many different directions (such as in the x-y plane), there may not be any dominant axial direction. In these cases, the generally wavy shape of the optical fiber allows the detection of noise and/or seismic signal components in two different directions.

Figure 8:
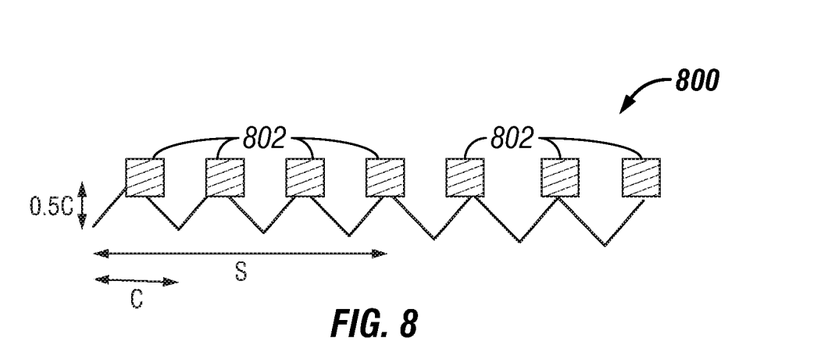
Figure 9:
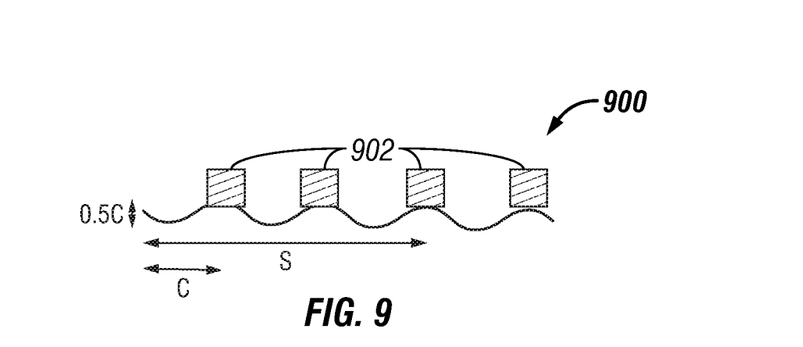

An optical fiber with curved portions can also be employed in implementations that use seismic sensors, such as in the FIG. 3 arrangement. FIG. 8 shows a wavy optical fiber 800 used with seismic sensors 802, and FIG. 9 shows another wavy optical fiber 900 used with seismic sensors 904. The wavy optical fibers 800 and 900 are similar to the wavy optical fiber 600 and 700.

Figure 10:
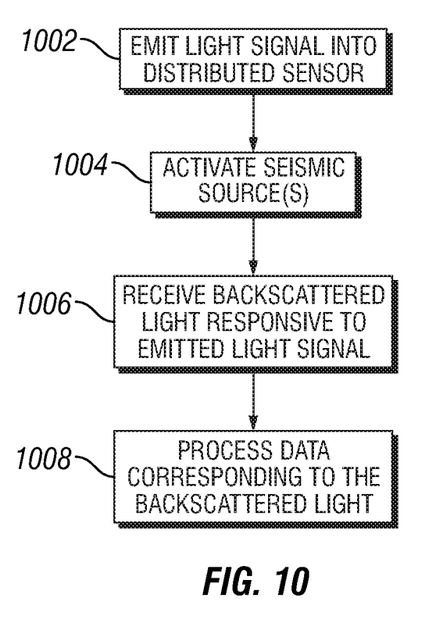
FIG. 10 is a flow diagram of a process of performing seismic surveying according to some embodiments.

FIG. 10 depicts a process of performing seismic surveying according to some embodiments. Light signal is emitted (at 1002) by the interrogation subsystem 102 into an optical fiber of a distributed sensor. Seismic source(s) is (are) activated (at 1004), which causes seismic signals to be propagated into a subterranean structure, with a portion reflected from the subterranean structure. Backscattered light is received (at 1006) from the optical fiber, where the backscattered light is responsive to the emitted light signal. The backscattered light is affected by perturbations, which can include noise and/or seismic signals. The received backscattered light is converted into corresponding data output to the processing subsystem 110. In general, many optical pulses will be emitted and launched into the fiber, and their backscatter collected, during the time it takes for a seismic signal to be generated, to propagate into the subterranean formation and return.

The processing subsystem 110 processes (at 1008) the data corresponding to the backscattered light to determine a characteristic of a subterranean structure. The data corresponding to the backscattered light can contain information to allow for determination of noise, or alternatively, the data can include seismic signals with the noise attenuated. As yet another alternative, the data corresponding to the backscattered light can include both noise and seismic signal components; in this latter alternative, the processing performed at 1008 would apply filtering to perform noise mitigation.

The processing subsystem 110 of FIG. 1 can include a processor (or multiple processors) to perform processing of seismic data and/or data representing backscattered light from a distributed optical sensor. Machine-readable instructions are executable on the processor(s) to perform the processing and analysis. A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A seismic acquisition system, comprising:
   a distributed optical sensor having an optical fiber for positioning outside a subterranean structure to be surveyed; and
   an interrogation subsystem configured to:
      generate a light signal to emit into the optical fiber;
      receive, from the distributed optical sensor, backscattered light responsive to the emitted light signal, wherein the backscattered light is affected by one or both of seismic signals reflected from the subterranean structure and noise; and
      output data corresponding to the backscattered light to a processing subsystem to determine a characteristic of the subterranean structure,
   wherein the distributed optical sensor and interrogation subsystem are configured to provide a spatial resolution having a predefined relationship to wavelength(s) of one or both of the seismic signals and the noise, and
   wherein the spatial resolution is less than the wavelength of the seismic signals.

2. The seismic acquisition system of claim 1, wherein the distributed optical sensor is arranged for use in one of land-based seismic surveying and marine seismic surveying.

3. The seismic acquisition system of claim 1, wherein the spatial resolution is greater than or equal to the wavelength of the noise.

4. The seismic acquisition system of claim 3, wherein the backscattered light provides a representation of the seismic signals with the noise attenuated.

5. The seismic acquisition system of claim 1, wherein the spatial resolution is less than a wavelength of the noise.

6. The seismic acquisition system of claim 5, wherein both the noise and the seismic signals are sampled in the backscattered light, the seismic acquisition system further comprising:
   a filter to attenuate the noise represented in the backscattered light.

7. The seismic acquisition system of claim 1, wherein the optical fiber is straight.

8. The seismic acquisition system of claim 1, wherein the optical fiber has curved portions, wherein the curved portions allow for detection of components of the noise and/or components of the seismic signals in plural multiple different directions.

9. The seismic acquisition system of claim 1, further comprising a streamer having the distributed optical sensor for towing through a body of water, wherein parts of the streamer have a diameter less than 4 centimeters.

10. The seismic acquisition system of claim 1, wherein the optical fiber is a first optical fiber dedicated to the distributed optical sensor, and the seismic acquisition system further comprises at least another optical fiber having regions of different sensitivities.

11. A seismic acquisition system, comprising:
   a distributed optical sensor having an optical fiber for positioning outside a subterranean structure to be surveyed; and
   an interrogation subsystem configured to:
      generate a light signal to emit into the optical fiber;
      receive, from the distributed optical sensor, backscattered light responsive to the emitted light signal, wherein the backscattered light is affected by one or both of seismic signals reflected from the subterranean structure and noise; and output data corresponding to the backscattered light to a processing subsystem to determine a characteristic of the subterranean structure, wherein the optical fiber has curved portions, wherein the curved portions allow for detection of components of the noise and/or components of the seismic signals in plural multiple different directions, and wherein the curved portions each has a curvature with a predefined relationship to wavelength(s) of one or both of the noise and the seismic signals.

12. The seismic acquisition system of claim 11, wherein the curvature is less than the wavelength of the seismic signals but greater than or equal to the wavelength of the noise, wherein the backscattered light provides a representation of the seismic signals with the component of the noise having a propagation direction in one of the multiple directions attenuated.

13. The seismic acquisition system of claim 11, wherein the curvature is less than the wavelength of the noise and the wavelength of the seismic signals, the seismic acquisition system further comprising:

the processing subsystem to resolve the noise into two perpendicular components that include (1) the component having a propagation direction generally in one of the multiple directions, and (2) a component having a propagation direction generally in another of the multiple directions.

14. A method comprising:

providing a distributed optical sensor having an optical fiber for performing a seismic survey of a subterranean structure;

emitting light into the optical fiber;

receiving backscattered light responsive to the emitted light from the optical fiber, wherein the backscattered light is affected by noise;

processing, by a processing subsystem, data relating to the backscattered light, wherein the data relating to the backscattered light represents one of: (1) the noise, (2) the noise and seismic signals reflected from the subterranean structure, and (3) the seismic signals reflected from the subterranean structure with the noise attenuated; and deriving a propagation speed of the noise using the data corresponding to the backscattered light.

15. The method of claim 14, further comprising:

providing seismic sensors;

receiving seismic data from the seismic sensors; and using, by the processing subsystem, the data corresponding to the backscattered light to remove the noise from the seismic data of the seismic sensors.

16. The method of claim 15, wherein the distributed optical sensor and the seismic sensors are provided as part of a streamer, the method further comprising:

towing the streamer through a body of water.

17. The method of claim 15, wherein the distributed optical sensor and the seismic sensors are provided to perform land seismic acquisition.

18. The method of claim 15, wherein the distributed optical sensor and the seismic sensors are provided as part of a seabed cable.

* * * * *